N. Palmer.
Horse Hay Fork.
Nº 36572  Patented Sep. 30, 1862
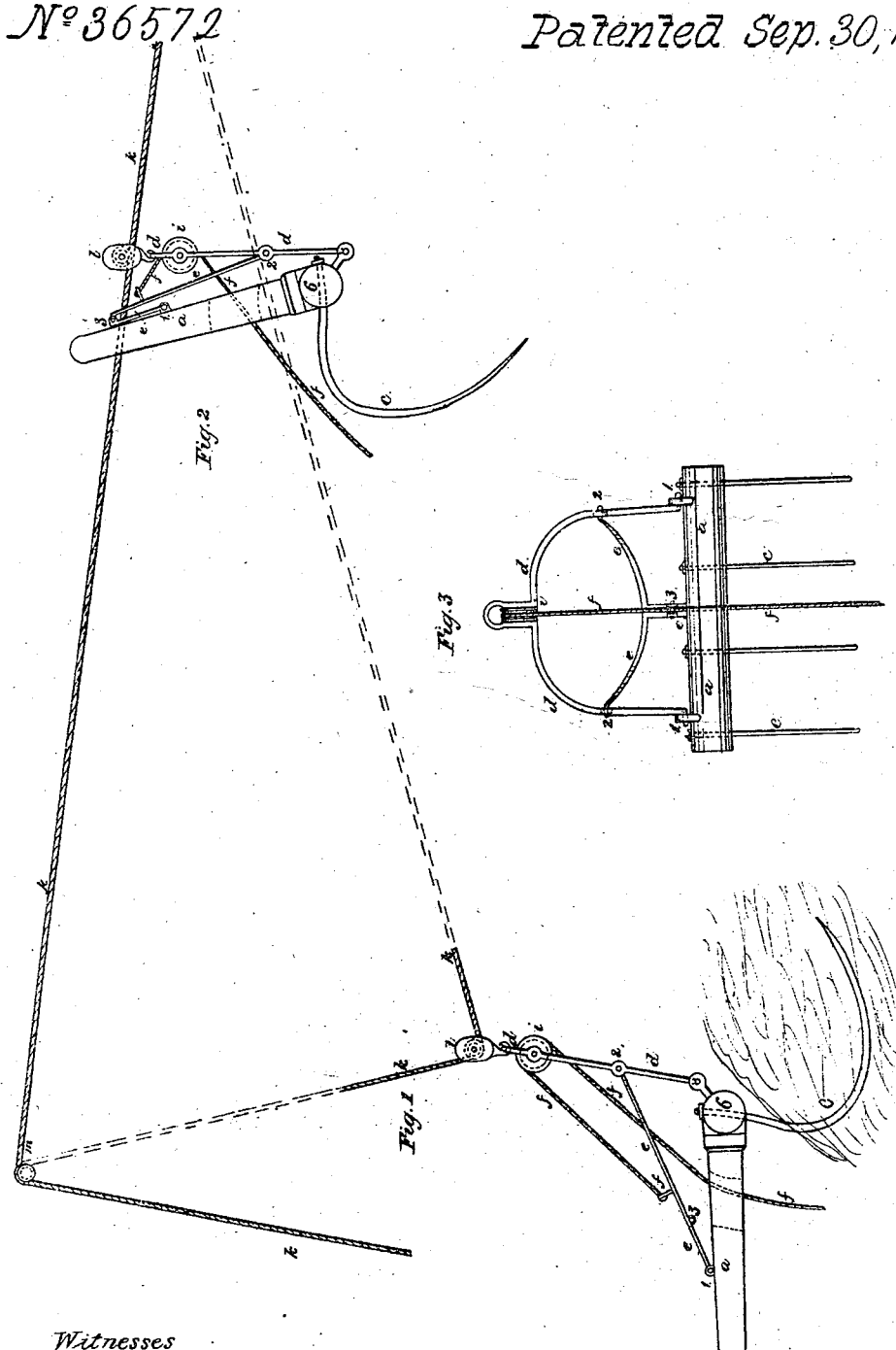
Witnesses
James Stevens
Ambrose Stevens
Inventor
Nelson Palmer

UNITED STATES PATENT OFFICE.

NELSON PALMER, OF GREENVILLE, NEW YORK.

IMPROVEMENT IN HAY-ELEVATORS.

Specification forming part of Letters Patent No. 36,572, dated September 30, 1862.

*To all whom it may concern:*

Be it known that I, NELSON PALMER, of Greenville, in the county of Greene and State of New York, have invented, made, and applied to use a certain Improvement in Hay-Elevators; and I do hereby declare the following to be a full, clear, and exact description of the same, reference being had to the annexed drawings, making part of this specification, wherein—

Figure 1 is an elevation of my fork as in use. Fig. 2 represents the fork after the hay has been discharged, and Fig. 3 is an elevation of the bail-head and tines.

Similar marks of reference denote the same parts.

The nature of my said invention consists in a bail and jointed brace, in combination with a hay-fork and discharging-rope, so arranged that the hay can easily be lifted and sustained while being conveyed to the place of delivery and then discharged, the fork drawing out from beneath the hay and laying it down evenly.

In the drawings, $a$ is a handle, with the head-piece $b$, receiving the tines $c$. These tines pass down from the lower side of the head-piece, and are curved upon the arc of an ellipse from the points of motion above on which the fork swings, so that they draw away from beneath the hay without disturbing the same, as hereinafter specified.

$d$ is a bail attached by hinge-eyes to the head-piece $b$.

$e$ is a brace formed as a toggle-joint, one end being attached, as at 1, to the handle $a$, and the other end, at 2, to the bail $d$. The brace-bars are united by a rule-joint, 3, that passes slightly below the line of centers, so that any end-thrust cannot shut the brace together; but when the center joint, 3, is drawn up away from the handle $a$ the brace and handle fold up against the bail $d$, as seen in Fig. 2, the parts being of the proper relative lengths, as shown.

$f$ is a rope attached near the joint 3, passing through a block, $i$, above the bail $d$, thence back through a mortise in the handle $a$ near the head $b$.

The hay-elevator is sustained by a rope, $k$, passing through a block, $l$.

The operation is as follows: The loading-rope $k$ is passed from a horse through a block on the barn-floor, thence through a block, $m$, near the barn-rafters, and thence through the block $l$, the end being fastened in the direction the hay is to be conveyed, as now usual. The fork or elevator is stuck into the hay, no matter in what portion of the load or in what direction. The brace and parts are to be in the position shown in Fig. 1. When the horse pulls on the main rope $k$ the loaded elevator is raised bodily, and then runs off to the required point of delivery, as usual, along the inclined rope $k$. When the attendant pulls the check-rope $f$ the joint 3 is raised and the hay delivered off the tines (curved as aforesaid) by said tines drawing from beneath it as the elevator swings on the eyes of the bail $d$ and at the upper part thereof at the block $l$. The parts assume the position of Fig. 2, ready to be drawn back to the load and again employed, as before. If the elevator is used for loading a cart from the mow, the inclination of the rope $k$ is reversed, as usual.

What I claim, and desire to secure by Letters Patent, is—

The combination of the bail $d$, jointed brace $e$, and cord $f$ with the hay-fork $a\ b\ c$, as and for the purposes specified.

In witness whereof I have hereunto set my signature this 18th day of August, 1862.

NELSON PALMER.

Witnesses:
  JAMES STEVENS,
  AMBROSE STEVENS.